(12) United States Patent
Valler et al.

(10) Patent No.: US 9,518,656 B2
(45) Date of Patent: Dec. 13, 2016

(54) VEHICLE AND A LOCKING ASSEMBLY FOR THE VEHICLE

(71) Applicant: GM GLOBAL TECHNOLOGY OPERATIONS LLC, Detroit, MI (US)

(72) Inventors: Gary R. Valler, Greenfield, IN (US); Shawn H. Swales, Canton, MI (US); Scott Vaubel, Attica, MI (US); Anthony J. Corsetti, Rochester Hills, MI (US); Arthur L. McGrew, Jr., Indianapolis, IN (US); Goro Tamai, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 56 days.

(21) Appl. No.: 14/477,197

(22) Filed: Sep. 4, 2014

(65) Prior Publication Data

US 2015/0160684 A1    Jun. 11, 2015

Related U.S. Application Data

(60) Provisional application No. 61/912,761, filed on Dec. 6, 2013.

(51) Int. Cl.
*F16H 63/34* (2006.01)

(52) U.S. Cl.
CPC ...... *F16H 63/3425* (2013.01); *F16H 63/3416* (2013.01)

(58) Field of Classification Search
CPC .............. F16H 63/3425; F16H 63/3433; F16H 63/3466; F16H 63/3416; F16H 63/34
See application file for complete search history.

(56) References Cited

U.S. PATENT DOCUMENTS 5,269,195 A * 12/1993 Kitagawara ............. B60T 1/005
188/69
2014/0102251 A1    4/2014 Corsetti et al.

FOREIGN PATENT DOCUMENTS

JP            H5-17264 U        3/1993

* cited by examiner

*Primary Examiner* — Huan Le
(74) *Attorney, Agent, or Firm* — Quinn Law Group, PLLC (57) ABSTRACT

A vehicle and a locking assembly are disclosed. The locking assembly includes a pawl rotatable about a pivot axis between an engaged position and a disengaged position. The pawl is adapted to engage the ring gear when in the engaged position for preventing movement of the ring gear. The locking assembly further includes an actuator selectively actuated to move the pawl to the engaged position. Additionally, the locking assembly includes a biasing mechanism engaging the pawl to continuously bias the pawl toward the disengaged position. The pawl includes a first tooth and a second tooth spaced from each other to define a gap therebetween. The first tooth and the second tooth are adapted to trap a tooth of the ring gear in the gap when the pawl is in the engaged position for preventing rotation of the ring gear.

20 Claims, 4 Drawing Sheets

VEHICLE AND A LOCKING ASSEMBLY FOR THE VEHICLE

CROSS-REFERENCE TO RELATED APPLICATIONS

This application claims the benefit of U.S. Provisional Application No. 61/912,761, filed on Dec. 6, 2013, which is hereby incorporated by reference in its entirety.

TECHNICAL FIELD

The present disclosure relates to a vehicle and a locking assembly for a ring gear operatively connected to a crankshaft of the vehicle.

BACKGROUND

Hybrid vehicles offer reduced fuel consumption and emissions by utilizing both an electric motor/generator and an internal combustion engine. A controller can be programmed to vary the use of the engine and the motor/generator during different driving conditions. When utilizing the motor/generator instead of the engine, the crankshaft of the engine is to remain stationary. For example, a disc clutch can be utilized to minimize rotation of the crankshaft, however drag can occur through frictional engagement with the disc clutch and spin loss can occur due to rotation which can impact the efficiency of the hybrid vehicle.

SUMMARY

The present disclosure provides a locking assembly for a ring gear operatively connected to a crankshaft. The locking assembly includes a pawl rotatable about a pivot axis between an engaged position and a disengaged position. The pawl is adapted to engage the ring gear when in the engaged position for preventing movement of the ring gear. The locking assembly further includes an actuator selectively actuated to move the pawl to the engaged position. Additionally, the locking assembly includes a biasing mechanism engaging the pawl to continuously bias the pawl toward the disengaged position. The pawl includes a first tooth and a second tooth spaced from each other to define a gap therebetween. The first tooth and the second tooth are adapted to trap a tooth of the ring gear in the gap when the pawl is in the engaged position for preventing rotation of the ring gear.

The present disclosure also provides a vehicle including a ring gear selectively rotatable about a longitudinal axis. The ring gear includes a plurality of teeth spaced from each other radially about the longitudinal axis. The vehicle also includes a locking assembly. The locking assembly includes a pawl rotatable about a pivot axis between an engaged position engaging the ring gear to prevent rotation of the ring gear and a disengaged position spaced from the ring gear to allow rotation of the ring gear. The pawl includes a first tooth and a second tooth spaced from each other to define a gap therebetween such that one of the teeth of the ring gear is trapped in the gap between the first tooth and the second tooth to prevent rotation of the ring gear when the pawl is in the engaged position.

The detailed description and the drawings or Figures are supportive and descriptive of the disclosure, but the scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Those having ordinary skill in the art will recognize that terms such as "above", "below", "upward", "up", "downward", "down", "top", "bottom", "left", "right", "back", "forth", etc., are used descriptively for the figures, and do not represent limitations on the scope of the disclosure, as defined by the appended claims.

Figure 1:
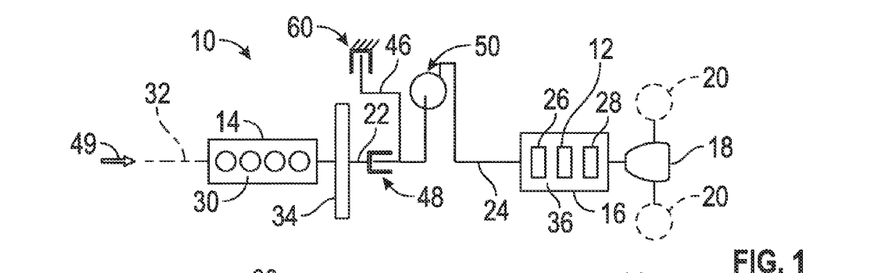
FIG. 1 is a schematic illustration of a vehicle.

Referring to the Figures, wherein like numerals indicate like or corresponding parts throughout the several views, a vehicle 10 is generally shown in FIG. 1. The vehicle 10 can be an automotive vehicle, such as, a car, a truck, etc. It is to be appreciated that the vehicle 10 can alternatively be a non-automotive vehicle, such as, a farm vehicle, a marine vehicle, an aviation vehicle, etc. Furthermore, the vehicle 10 can be a hybrid vehicle or an electric vehicle that includes, for example, one or more motor-generators 12 which can assist in reducing fuel consumption and emissions of the vehicle 10. For example, the motor-generator 12 can be utilized as a motor to start the engine 14 or as a torque assist. As another example, the motor-generator 12 can be utilized as a generator to generate electricity or recharge an energy storage device, such as a battery. It is to be appreciated that the vehicle 10 can be any other suitable vehicle 10.

Continuing with FIG. 1, generally, the vehicle 10 can include an engine 14, a transmission 16 and a final drive 18 operatively connected to each other to rotate wheels 20 of the vehicle 10 to propel the vehicle 10. The engine 14 can include an output member 22 or crankshaft 22 which is operatively connected to an input member 24 of the transmission 16. Generally, the engine 14 can house the crankshaft 22. The transmission 16 can include a gearing arrangement 26 and one or more clutches 28 through which torque is transferred from the output member 22 of the engine 14 to the input member 24 of the transmission 16, then to the final drive 18 and out to the wheels 20 to move the vehicle 10. The wheels 20 can be front wheels 20 or rear wheels 20 of the vehicle 10. Furthermore, the transmission 16 can include the motor-generator 12 as mentioned above.

Figure 2:
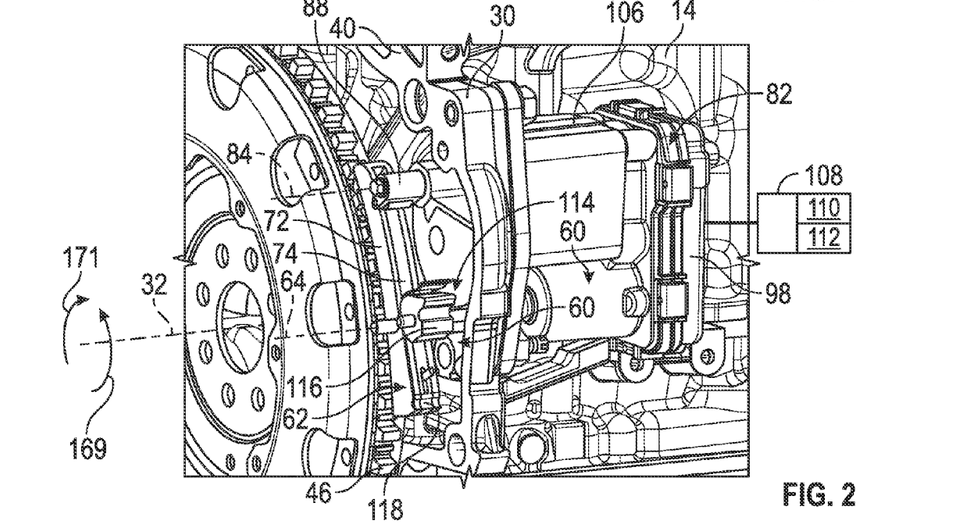
FIG. 2 is a schematic fragmentary perspective view of an engine, with a locking assembly disposed partially outside of an engine block and partially inside a transmission area.

Turning to FIGS. 1 and 2, the engine 14 can be an internal combustion engine. The engine 14 can include an engine block 30 having the crankshaft 22 disposed therein. The crankshaft 22 is rotatable about a longitudinal axis 32. In the Figures, the crankshaft 22 is shown schematically without any specific features for illustrative purposes only and it is to be appreciated that the crankshaft 22 can have various configurations to cooperate with other components of the engine 14. The engine 14 can also include a flywheel 34, one or more connecting rods, pistons, valves, etc., which will not be discussed further. Various components, such as the engine 14, the transmission 16, etc., discussed above can be part of a powertrain. The powertrain can be referred to as a hybrid powertrain for a hybrid vehicle application which utilizes both the internal combustion engine and one or more motor-generators 12. In the electric vehicle application, the internal combustion engine is eliminated and utilizes one or more motor-generators 12. In the electric vehicle application, the powertrain can be referred to as an electro-mechanical drive unit.

Figure 3:
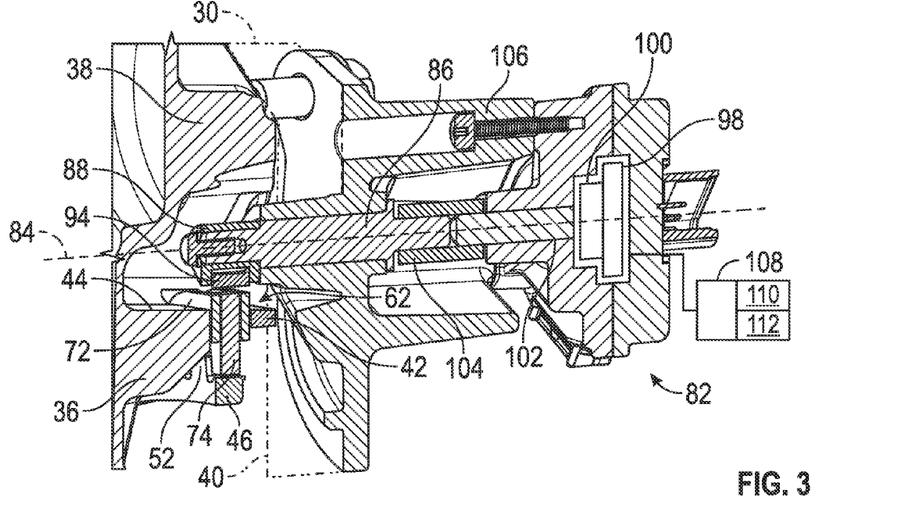
FIG. 3 is a schematic fragmentary cross-sectional view of the locking assembly with a wall of the engine block illustrated in phantom lines for illustrative purposes.
Figure 4:
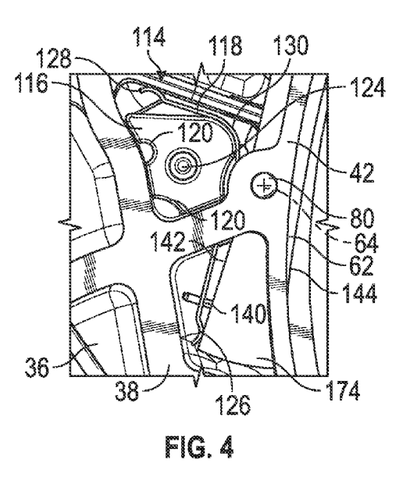
FIG. 4 is a schematic fragmentary side view of a biasing mechanism and a pawl installed on a transmission housing.
Figure 5:
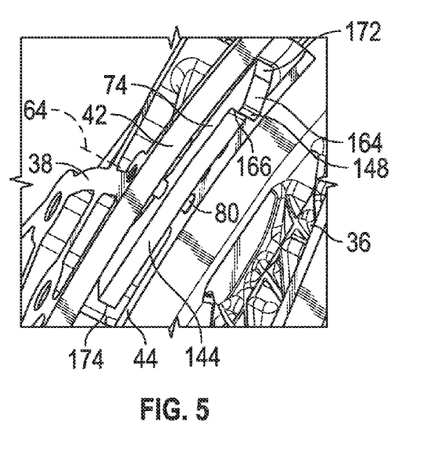
FIG. 5 is a schematic fragmentary perspective view of a second pawl segment of the pawl installed on the transmission housing, with a first pawl segment removed for illustrative purposes.

Referring to FIGS. 1 and 3-5, the transmission 16 can include a transmission housing 36 attached to the engine block 30. The engine block 30 is shown in phantom lines in FIG. 3 for illustrative purposes only. Generally, one of the walls 38 of the transmission housing 36 can be attached to one of the walls 40 of the engine block 30 to enclose various components within the transmission housing 36. In certain embodiments, as best shown in FIG. 5, the transmission housing 36 can have a first support 42 and a second support 44 spaced from each other. The first and second supports 42, 44 are enclosed in the transmission housing 36 when the transmission housing 36 is attached to the engine block 30. Furthermore, in one embodiment, the first and second supports 42, 44 can both be attached to one of the walls 38 of the transmission housing 36 (see FIG. 5). In another embodiment, the first and second supports 42, 44 can both be attached to one of the walls 40 of the engine block 30. In yet another embodiment, the first support 42 can be attached to one of the walls 38 of the transmission 16 and the second support 44 can be attached to one of the walls 40 of the engine block 30, or vice versa. It is to be appreciated that the engine block 30 and the transmission housing 36 can be any suitable configurations and locations. Additionally, it is to be appreciated that the first and second supports 42, 44 can be any suitable configurations and locations.

Turning to FIGS. 1 and 2, the vehicle 10 can include a ring gear 46 disposed outside of the engine block 30. In one embodiment, the ring gear 46 is disposed in the transmission housing 36. The ring gear 46 is operatively connected to the crankshaft 22 and is selectively rotatable about the longitudinal axis 32. Thus, the ring gear 46 and the crankshaft 22 can rotate in unison about the longitudinal axis 32. The ring gear 46 and the crankshaft 22, for example, can rotate in a clockwise direction or a counter-clockwise direction about the longitudinal axis 32.

The vehicle can also include a first clutch 48 (see FIG. 1) disposed between the flywheel 34 and the ring gear 46. The first clutch 48 can be operatively connected to the crankshaft 22. Therefore, the first clutch 48 can rotatably disconnect the crankshaft 22 and the ring gear 46 when a predetermined engine torque is obtained. Therefore, the first clutch 48 allows slip to occur between the crankshaft 22 and the ring gear 46 when the predetermined engine torque is obtained. The first clutch 48 is activated to limit the amount of engine torque transferred to the ring gear 46. Generally, the first clutch 48 is disposed downstream to the engine 14 (see FIG. 1). Downstream as used herein is the direction flowing from the engine 14 toward the transmission 16, etc., and the arrow 49 in FIG. 1 points in the downstream direction. The first clutch 48 can include one or more friction plates, etc. The first clutch 48 can be referred to as a breakaway clutch or a slip clutch.

Furthermore, as shown in FIG. 1, a damper 50 can be disposed between the ring gear 46 and the final drive 18. The damper 50 can dampen relative movement between various components. Specifically, the damper 50 can absorb torsional vibrations generated by the engine 14 before the vibrations are transmitted to various components of the transmission 16. The damper 50 can include one or more springs, etc.

Figure 6:
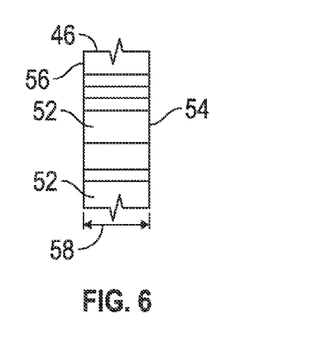
FIG. 6 is a schematic fragmentary side view of a ring gear illustrating a first width of the ring gear.
Figure 7:
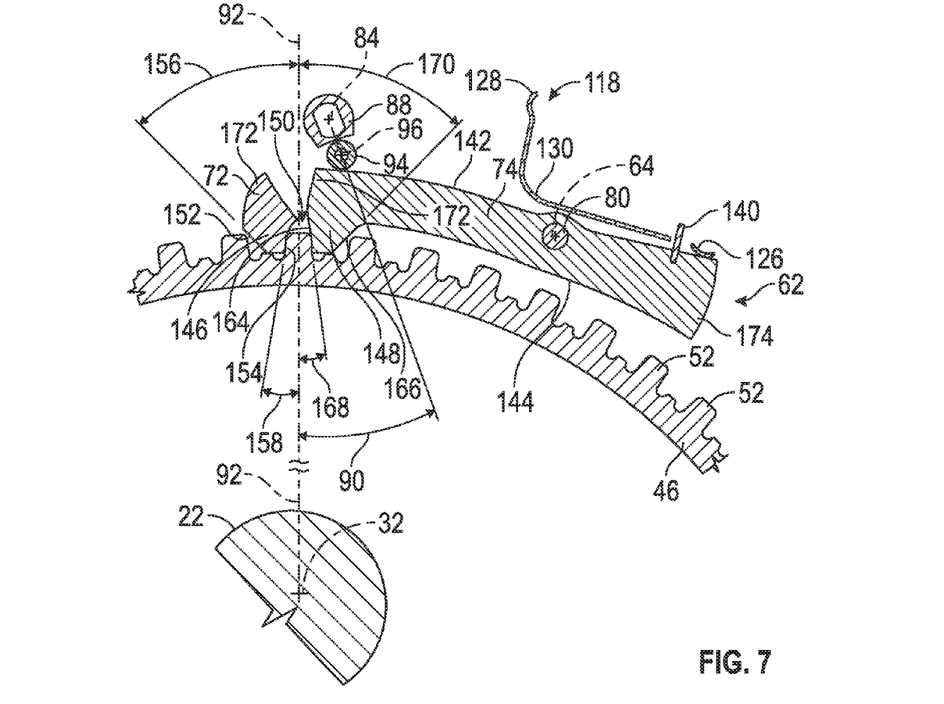
FIG. 7 is a schematic fragmentary cross-sectional view of the ring gear, the first and second pawl segments, the spring, the distal end of an extension and a crankshaft.

Turning back to the ring gear 46, as best shown in FIGS. 2, 6 and 7, the ring gear 46 can include a plurality of teeth 52, and in one embodiment, the teeth 52 each face outwardly away from the longitudinal axis 32. For example, the teeth 52 can be spaced from each other radially about the longitudinal axis 32.

Referring to FIG. 6, the ring gear 46 can include a first side 54 and a second side 56 spaced from each other to present a first width 58 of the ring gear 46. The teeth 52 of the ring gear 46 are disposed between the first and second sides 54, 56, and thus also present the first width 58.

Generally, a locking assembly 60 or brake assembly is best shown in FIG. 2 to selectively prevent movement of the crankshaft 22 during electric vehicle (EV) operation of the hybrid/electric vehicle. The vehicle 10 can include the locking assembly 60. The locking assembly 60 acts as an engine brake to prevent rotation of the ring gear 46 and thus the crankshaft 22 during EV operation of the hybrid/electric vehicle. Generally, energy can be saved by preventing rotation of the crankshaft 22 during EV operation. Therefore, utilizing the locking assembly 60 described herein, energy can be saved by preventing rotation of the crankshaft 22 when the vehicle 10 is operating in the EV mode. Additionally, saving energy can maximize range and fuel economy of the vehicle 10. Furthermore, drag and spin loss is eliminated utilizing the locking assembly 60 as discussed further below.

As shown in FIG. 1, the ring gear 46 and the locking assembly 60 are disposed downstream to the first clutch 48. Furthermore, the damper 50 is operatively connected to the input member and disposed downstream to the locking assembly 60. Specifically, the locking assembly 60 is located upstream to the damper springs of the damper 50, i.e., located upstream of the primary inertia side of the damper 50. By orientating these components in this relationship, the first clutch 48 and the locking assembly 60 can operate without interfering with each other, and thus, these components do not have to be designed to account for larger forces. For example, torque applied from the transmission side through the locking assembly 60 does not pass through the first clutch 48. The primary inertia side of the damper 50 is maximized with this arrangement of the locking assembly 60 and the first clutch 48, which can also suppress noise.

Figure 8:
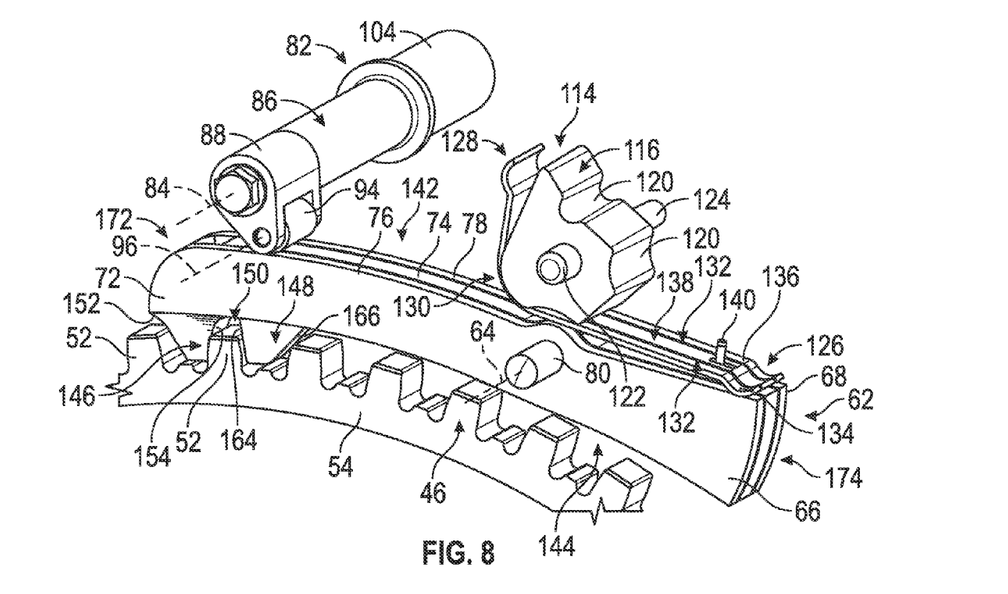
FIG. 8 is a schematic fragmentary perspective view of the pawl in an engaged position.
Figure 9:
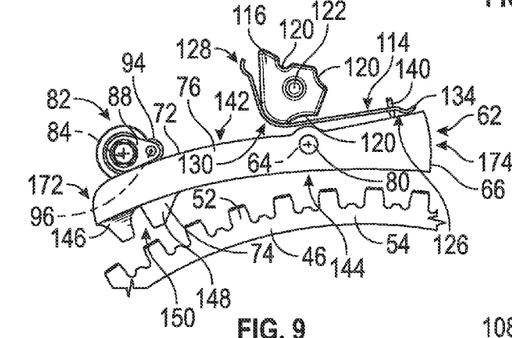
FIG. 9 is a schematic side view of the pawl in a disengaged position and illustrating the spring engaging the pawl at the second end.

Also turning to FIGS. 8 and 9, generally, the locking assembly 60 can include a pawl 62 adapted to selectively engage the ring gear 46 to selectively prevent movement of the ring gear 46. The pawl 62 is rotatable about a pivot axis 64 between an engaged position and a disengaged position. The pawl 62 is adapted to engage the ring gear 46 when in the engaged position for preventing movement of the ring gear 46. The pawl 62 is adapted to disengage, i.e., spaced from, the ring gear 46 when in the disengaged position for allowing movement of the ring gear 46. Specifically, the pawl 62 is rotatable about the pivot axis 64 to the engaged position engaging the ring gear 46, and specifically engages one of the teeth 52 of the ring gear 46, to prevent rotation of the ring gear 46. The pawl 62 is rotatable about the pivot axis 64 to the disengaged position spaced from the ring gear 46, and specifically spaced away from the teeth 52 of the ring gear 46, to allow rotation of the ring gear 46. The pawl 62 rotates about the pivot axis 64 and does not slide along the pivot axis 64 into engagement with one of the teeth 52 of the ring gear 46.

The pawl 62 is spaced from the ring gear 46 when in the disengaged position and thus drag is eliminated. Furthermore, the pawl 62 does not continuously rotate during operation of the vehicle 10 and thus the pawl 62 does not create any spin losses. The pawl 62 only moves when changing between positions. Therefore, the pawl 62 remains stationary when in the engaged position, and the pawl 62 remains stationary when in the disengaged position.

In certain embodiments, the pivot axis 64 and the longitudinal axis 32 spaced and substantially parallel to each other. The ring gear 46 is operatively connected to the crankshaft 22 such that the ring gear 46 and the crankshaft 22 rotatable in unison about the longitudinal axis 32 when the pawl 62 is in the disengaged position, and the ring gear 46 and the crankshaft 22 remain substantially stationary when the pawl 62 is in the engaged position. The engaged position is shown in FIGS. 2, 7 and 8 and the disengaged position is shown in FIG. 9.

Figure 10:
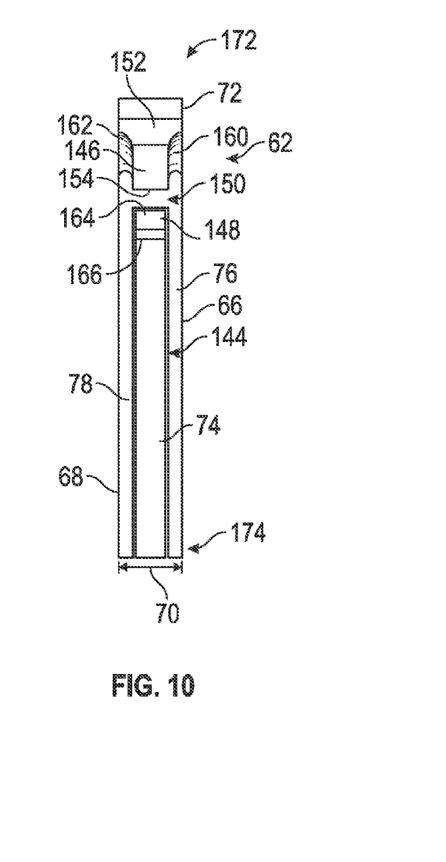
FIG. 10 is a schematic bottom view of the pawl illustrating a second width of the pawl, and a first tooth and a second tooth spaced from each other.
Figure 11:
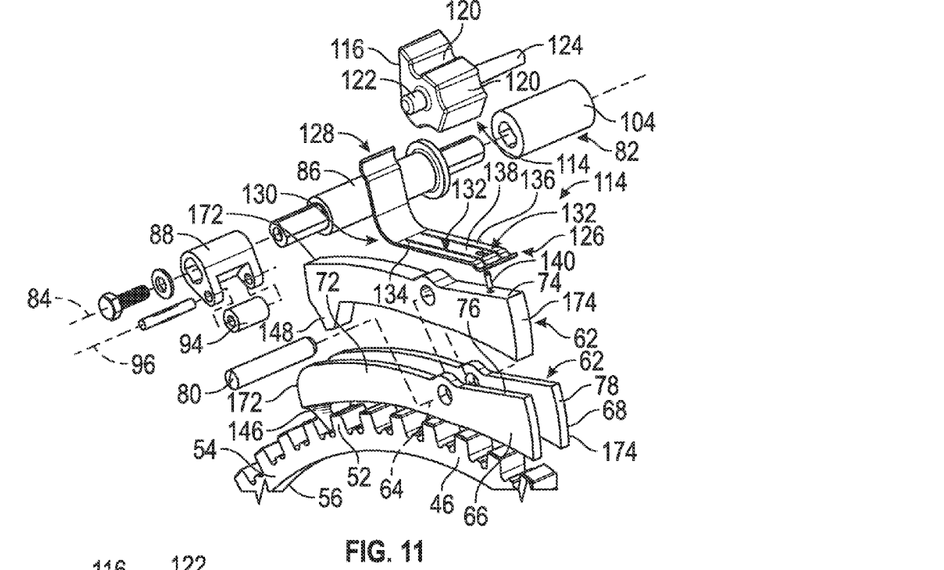
FIG. 11 is a schematic exploded perspective view of the components of FIG. 7.

Referring to FIGS. 10 and 11, the pawl 62 can include a first side edge 66 and a second side edge 68 spaced from each other to present a second width 70 substantially equal to or less than the first width 58 of the ring gear 46. Designing the pawl 62 with the second width 70 substantially equal to or less than the first width 58 of the ring gear 46 provides a space savings. Furthermore, the pawl 62 rotates about the pivot axis 64 toward and away from the teeth 52 of the ring gear 46, instead of moving along the pivot axis 64 into and out of engagement with the teeth 52 of the ring gear 46, which also provides a space savings. Meaning the sliding movement would require more space to accommodate engagement and disengagement. As such, rotating the pawl 62 about the pivot axis 64 provides a space savings as less packaging space is needed for rotational movement versus the sliding movement along the pivot axis 64.

Furthermore, the pawl 62 can include a first pawl segment 72 and a second pawl segment 74 each rotatable about the pivot axis 64. As shown in the Figures, the first and second pawl segments 72, 74 are separate pieces. Generally, in certain embodiments, the first and second pawl segments 72, 74 rotate in unison with each other. In other embodiments, the first pawl segment 72 and the second pawl segment 74 can start rotating one after the other.

The first pawl segment 72 can include a first leg 76 and a second leg 78 spaced from each other with the second pawl segment 74 disposed between the first and second legs 76, 78. Simply stated, the second pawl segment 74 is nested within the first paw segment 72. Therefore, the second pawl segment 74 is nested between the first and second legs 76, 78. Generally, the first leg 76 includes the first side edge 66 and the second leg 78 includes the second side edge 68.

Referring to FIGS. 4 and 5, in certain embodiments, the pawl 62 is rotatable attached to the first and second supports 42, 44 of the transmission housing 36. In other embodiments, the pawl 62 can be rotatably attached to the transmission housing 36 and the engine block 30. In yet other embodiments, the pawl 62 can be rotatably attached to the engine block 30. Specifically, a first pin 80 can be disposed through the pawl 62 and the first pin 80 is disposed along the pivot axis 64. Therefore, the pawl 62 rotates about the first pin 80 and thus the pivot axis 64. In certain embodiments, the first pin 80 is secured to transmission housing 36. In other embodiments, the first pin 80 is attached to the transmission housing 36 and the engine block 30. In yet other embodiments, the first pin 80 is attached to the engine block 30.

Turning to FIGS. 7 and 10, the pawl 62 includes a first tooth 146 and a second tooth 148 adapted to selectively engage the ring gear to selectively prevent movement of the ring gear. In certain embodiments, the first tooth 146 and the second tooth 148 align with each other in a spaced relationship (see FIG. 10).

Turning to FIGS. 2, 3 and 8, the locking assembly 60 can also include an actuator 82 selectively actuated to move the pawl 62 to the engaged position. The actuator 82 can engage the pawl 62 and is at least partially movable relative to the pawl 62 to correspondingly move the pawl 62. The actuator 82 can have different orientations (compare FIGS. 3 and 13). In certain embodiments, at least part of the actuator 82 is rotatable about a first axis 84 (best shown in FIG. 3). In other embodiments, at least part of the actuator 82 is movable along the first axis 84 (see FIG. 13). Therefore, the first axis 84 can change locations. In both embodiments of FIGS. 3 and 13, the actuator 82 can include an extension 86 having a distal end 88 engaging the pawl 62. Specifically, the distal end 88 engages both the first and second pawl segments 72, 74. Even more specifically, the distal end 88 engages both the first and second legs 76, 78. The extension 86 and the distal end 88 can be rotatable about the first axis 84 (see embodiment of FIG. 3). The distal end 88 remains in engagement with the first and second pawl segments 72, 74 during rotation of the distal end 88 about the first axis 84. In certain embodiments, rotation of the distal end 88 can push the first tooth 146 and the second tooth 148 to the engaged position.

Figure 13:
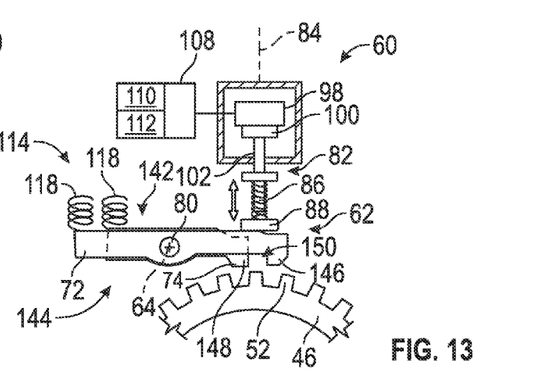
FIG. 13 is a schematic fragmentary side view of another embodiment of an actuator and a biasing mechanism.
Figure 14:
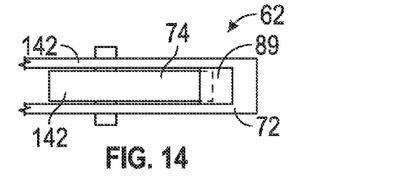
FIG. 14 is a schematic top view of the pawl of FIG. 13.

Alternatively, the extension 86 and the distal end 88 can be movable along the first axis 84 (see embodiment of FIG. 13). In the embodiment of FIG. 13, the extension 86 and/or the distal end 88 can move along the first axis 84 toward the pawl 62 to move the first and second pawl segments 72, 74 into the engaged position engaging one of the teeth 52 of the ring gear 46. Simply stated, for FIG. 13, the extension 86 and/or the distal end 88 can push the first tooth 146 and the second tooth 148 to the engaged position. For this embodiment, the distal end 88 engages both the first and second pawl segments 72, 74 as well. In certain embodiments, the configuration of the distal end 88 is eccentric, i.e., non-concentric, relative to the first axis 84 to allow the pawl 62 to move between the engaged and disengaged position. It is to be appreciated that the distal end 88 can be any suitable configuration corresponding to the desired embodiment. Optionally, for all of the embodiments herein, the first pawl segment 72 can include a tab 89 (see FIG. 14) partially overlapping the second pawl segment 74 such that the distal end 88 engages the tab 89 (and optionally engages the first pawl segment 72) to move the pawl 62.

The actuator 82 can rotate about the first axis 84 between a first position (as shown in FIGS. 7 and 8) which corresponds to the pawl 62 being in the engaged position to a second position (as shown in FIG. 9) which corresponds to the pawl 62 being in the disengaged position. Specifically, the distal end 88 rotates about the first axis 84 between the first and second positions.

Referring to FIG. 7, the first position can be when the distal end 88 is orientated in engagement with the pawl 62 at a first angle 90 relative to a plane 92 that is perpendicular to the longitudinal axis 32. Generally, the first angle 90 can be from about 10.0 degrees to about 30.0 degrees. In certain embodiments, the first angle 90 is from about 18.0 degrees to about 24.0 degrees. In yet other embodiments, the first angle 90 is from about 20.0 degrees to about 22.0 degrees. In one embodiment, the first angle 90 is about 21.5 degrees. Generally, the distal end 88 can rotate an additional 40.0 degrees to about 60.0 degrees from the initial first angle 90 at the first position to the second position. In certain embodiments, the distal end 88 can rotate an additional 50.0 degrees to about 55.0 degrees from the initial first angle 90 at the first position to the second position. In one embodiment, the distal end 88 can rotate an additional 53.0 degrees from the initial first angle 90 at the first position to the second position. It is to be appreciated that the values of the first angle 90 and the values for the additional rotation to the second position are examples and other values are possible.

Figure 12:
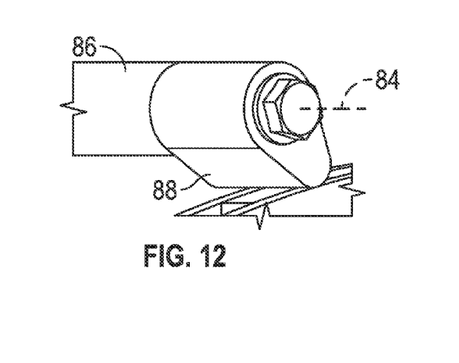
FIG. 12 is a schematic fragmentary perspective view of an alternative configuration of a distal end of an extension of an actuator.

In certain embodiments, as best shown in FIGS. 8 and 11, optionally, the distal end 88 can include a roller 94 engaging the pawl 62, and more specifically, engaging both of the first and second pawl segments 72, 74. The roller 94 can rotate along the pawl 62 as the extension 86/distal end 88 rotates about the first axis 84. Specifically, the roller 94 can rotate about a second axis 96 spaced and substantially parallel to the first axis 84. The roller 94 can be concentric relative to the second axis 96 (as shown in FIG. 7), eccentric, i.e., non-concentric, relative to the second axis 96 or any other suitable configuration, such as cammed, angled, tapered, etc. In other embodiments, as shown in FIG. 12, the roller 94 can be eliminated and thus there is sliding engagement between the distal end 88 and the pawl 62. In the embodiment of FIG. 12, the distal end 88 can be eccentric, i.e., non-concentric. The distal end 88 of the extension 86 can be a separate piece or unitary with the extension 86. The distal end 88 can be keyed to the extension 86 or attached to the extension 86 in any suitable methods, such as one or more fasteners, etc. It is to be appreciated that the distal end 88 can be any suitable configuration, such as cammed, angled, tapered, etc.

Referring to FIGS. 2 and 3, the actuator 82 can further include a motor 98 and gearing 100 operatively connected to each other and disposed outside of the transmission housing 36. Additionally, the actuator 82 can include a shaft 102 operatively connected to the gearing 100, the motor 98 and the extension 86 to rotate the extension 86 and the distal end 88 about the first axis 84. A first part of the actuator 82 can be disposed inside the transmission housing 36 and a second part of the actuator 82 can be disposed outside of the transmission housing 36. The motor 98 can be a solenoid or any other suitable device to rotate the shaft 102. Low power can run the motor 98 by utilizing the mechanical locking arrangement herein. Specifically, by utilizing the pawl 62 to mechanically lock and unlock the ring gear 46, the power to run the motor 98 can be low. As one example, the motor 98 can be powered by about 10.0 watts. It is to be appreciated that the above watt value is one example and the motor 98 can be powered by other wattage. It is to also be appreciated that the motor 98 can be referred to as a rotary motor 98. It is to also be appreciated that motor 98 can be hydraulic, mechanical, electro-mechanical, solenoid, or any other suitable mechanism move the distal end 88 in a desired motion.

The actuator 82 can also include a connector 104 (see FIG. 3) disposed between the shaft 102 and the extension 86 to rotatably connect the extension 86 and the shaft 102 to rotate the distal end 88. The shaft 102, the connector 104 and the extension 86 can be keyed to each other or attached to each other by any suitable methods. The actuator 82 can also include an adaptor 106 attached to the engine block 30 to secure the actuator 82 in the desired position. The motor 98 and gearing 100 is also supported by the adaptor 106. The second part of the actuator 82 being disposed outside of the transmission housing 36 can include the motor 98, the gearing 100, the shaft 102, the connector 104, at least part of the adaptor 106, etc. The first part of the actuator 82 being disposed inside of the transmission housing 36 can include the distal end 88, at least part of the extension 86, etc.

Turning to FIG. 2, the vehicle 10 can further include a controller 108 in communication with the actuator 82. More specifically, the controller 108 can be in communication with the motor 98 to selectively rotate the distal end 88 of the actuator 82. In other words, the controller 108 is in communication with the actuator 82 to selectively actuate the actuator 82. The controller 108 can provide positional control and/or feedback regarding the distal end 88 of the extension 86 and thus the position of the pawl 62. Furthermore, the controller 108 and/or another controller can be in communication with the motor-generator 12 and/or other components of the vehicle 10.

The controller 108 can be part of an electronic control module, e.g., an engine control module. The controller 108 includes a processor 110 and a memory 112 on which is recorded instructions for rotating the actuator 82. The controller 108 is configured to execute the instructions from the memory 112, via the processor 110. For example, the controller 108 can be a host machine or distributed system, e.g., a computer such as a digital computer or microcomputer, acting as a vehicle control module, and/or as a proportional-integral-derivative (PID) controller 108 device having a processor, and, as the memory 112, tangible, non-transitory computer-readable memory such as read-only memory (ROM) or flash memory. The controller 108 can also have random access memory (RAM), electrically erasable programmable read only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Therefore, the controller 108 can include all software, hardware, memory 112, algorithms, connections, sensors, etc., necessary to monitor and control the actuator 82. It is to be appreciated that the controller 108 can also include any device capable of analyzing data from various sensors, comparing data, making the necessary decisions required to control and actuate the actuator 82.

Furthermore, referring to FIGS. 4, 8 and 9, generally, the locking assembly 60 can further include a biasing mechanism 114 engaging the pawl 62 to continuously bias the pawl 62 toward the disengaged position. The biasing mechanism 114 can bias the pawl 62 into continuous engagement with the actuator 82. Therefore, as the actuator 82 moves, the pawl 62 correspondingly moves, which moves the first tooth 146 and the second tooth 148 between the engaged and disengaged positions. The biasing mechanism 114 can also include a member 116 and a spring 118. The spring 118 can engage the pawl 62 to continuously bias the pawl to the disengaged position and into continuous engagement with the actuator 82. In certain embodiments, the spring 118 can engage the pawl 62 and the member 116 to continuously bias the pawl to the disengaged position and into continuous engagement with the actuator 82. Therefore, the rotational position of the distal end 88 of the actuator 82 will determine the position of the pawl 62 relative to the ring gear 46. The member 116 can be referred to as a support block.

The member 116 can define one or more recesses 120 (see FIG. 4) that cooperate with the contours of the transmission housing 36 and/or the engine block 30. It is to be appreciated that the recesses 120 are optional and the member 116 can be any suitable configuration. Furthermore, referring to FIGS. 2, 4 and 8, the member 116 can include a first projection 122 and a second projection 124 extending outwardly from the member 116 in an opposing relationship. The first and second projections 122, 124 engage the transmission housing 36 and/or the engine block 30 to support the member 116. In one embodiment, the first projection 122 engages the transmission housing 36 and the second projection 124 engages the engine block 30. It is to be appreciated that the first and second projections 122, 124 can be the same or different lengths, the same or different configurations, etc.

As best shown in FIGS. 8 and 11, the spring 118 can include a first portion 126, a second portion 128 and a third portion 130 disposed between the first and second portions 126, 128. Generally, the first portion 126 engages the pawl 62, the second portion 128 engages the transmission housing 36 and the third portion 130 engages the member 116. Generally, the member 116 is spaced from the pawl 62 as best shown in FIG. 9 and at least the first portion 126 of the spring 118 is disposed between the member 116 and the pawl 62. The first portion 126 applies a load to the pawl 62 to continuously bias the pawl 62 toward the disengaged position. The second portion 128 of the spring 118 engages the transmission housing 36 such that the transmission housing 36 provides a reaction surface for the spring 118. The third portion 130 of the spring 118 engages the member 116 such that the member 116 provides a reaction surface for the spring 118. The third portion 130 of the spring 118 can contour around the member 116 in any suitable orientation. When the pawl 62 is in the disengaged position, the spring 118 applies a suitable amount of force to maintain disengagement of the pawl 62 from the ring gear 46 even when a force is applied to the outside of the vehicle 10 in the same direction that the pawl 62 can rotate.

Generally, the spring 118 is a non-coil spring as shown in the Figures for the embodiment of FIGS. 2-4, 7-9 and 11. In other embodiments, the spring 118 can be a coil spring as shown in FIG. 13. It is to also be appreciated that more than one spring 118 can be utilized as shown in FIG. 13 and the springs 118 in the embodiment of FIG. 13 can react against a member, the wall 38 of the transmission housing 36 and/or the wall 40 of the engine block 30.

In certain embodiments, the spring 118 can define a plurality of slits 132 (see FIGS. 8 and 11) spaced from each other to split the spring 118 into a first biasing arm 134 engaging the first leg 76 of the first pawl segment 72, a second biasing arm 136 engaging the second leg 78 of the first pawl segment 72 and a third biasing arm 138 engaging the second pawl segment 74. More specifically, the first portion 126 of the spring 118 defines the plurality of slits 132 spaced from each other to split the first portion 126 into the first biasing arm 134, the second biasing arm 136 and the third biasing arm 138. In one embodiment, the third biasing arm 138 is disposed between the first and second biasing arms 134, 136. The first biasing arm 134 applies the desired spring force to the first leg 76, the second biasing arm 136 applies the desired spring force to the second leg 78 and the third biasing arm 138 applies the desired spring force to the second pawl segment 74.

Turning to FIGS. 8, 9 and 11, additionally, the biasing mechanism 114 can include a dowel pin 140. Generally, the dowel pin 140 is attached to the second pawl segment 74 and engages the spring 118 to position the spring 118 relative to the first and second pawl segments 72, 74. Specifically, the dowel pin 140 is disposed through the third biasing arm 138. As such, the dowel pin 140 positions the first biasing arm 134 relative to the first leg 76, the second biasing arm 136 relative to the second leg 78 and the third biasing arm 138 relative to the second pawl segment 74. It is to be appreciated that the dowel pin 140 can be disposed through the spring 118 and the pawl 62 in any suitable location.

Referring to FIGS. 7 and 8, the pawl 62 can include an outer side 142 facing the actuator 82 and an inner side 144 opposing the outer side 142. More specifically, the first and second pawl segments 72, 74 can each include the outer and inner sides 142, 144. As such, the first tooth 146 extends from the inner side 144 of the first pawl segment 72 and the second tooth 148 extends from the inner side 144 of the second pawl segment 74. Generally, the inner side 144 faces the ring gear 46. Therefore, the first biasing arm 134, the second biasing arm 136 and the third biasing arm 138 engage the outer side 142 of the pawl 62.

As discussed above, the pawl 62 includes the first tooth 146 and the second tooth 148. The first tooth 146 and the second tooth 148 are spaced from each other to define a gap 150 therebetween. The first tooth 146 and the second tooth 148 are adapted to trap a tooth 52 of the ring gear 46 in the gap 150 when the pawl 62 is in the engaged position for preventing rotation of the ring gear 46. Said differently, the first tooth 146 and the second tooth 148 are spaced from each other to define the gap 150 therebetween such that one of the teeth 52 of the ring gear 46 is trapped in the gap 150 between the first tooth 146 and the second tooth 148 to prevent rotation of the ring gear 46 when in the pawl 62 is in the engaged position. The first tooth 146 and the second tooth 148 align with each other axially (see FIG. 10). Specifically, the first tooth 146 and the second tooth 148 align with each other in a spaced relationship along the inner side 144. The location of the first tooth 146 and the second tooth 148 relative to the teeth 52 of the ring gear 46 prevents side loading, i.e., applying a force to the side, of the pawl 62 along the first and second side edges 66, 68.

The pawl 62 is movable to the engaged position to dispose one of the teeth 52 of the ring gear 46 in the gap 150 between the first tooth 146 and the second tooth 148 which prevents rotation of the ring gear. Furthermore, the pawl 62 is moveable to the disengaged position to space the first tooth 146 and the second tooth 148 away from the teeth 52 which allows rotation of the ring gear 46. One of the teeth 52 of the ring gear 46 is disposed in the gap 150 when the pawl 62 is in the engaged position which prevents rotation of the ring gear 46 and thus prevents rotation of the crankshaft 22. Simply stated, one of the teeth 52 of the ring gear 46 is trapped between the first tooth 146 and the second tooth 148 which prevents the ring gear 46 from rotating in both the clockwise and counter-clockwise direction about the longitudinal axis 32. The first tooth 146 and the second tooth 148 cooperate to capture one of the teeth 52 of the ring gear 46 in the gap 150. Trapping one of the teeth 52 of the ring gear 46, the locking assembly 60 acts as an engine brake to prevent rotation of the ring gear 46 and thus the crankshaft 22 during EV operation of the hybrid/electric vehicle.

The first tooth 146 and the second tooth 148 each extend outwardly from the inner side 144 away from the outer side 142. Specifically, the first tooth 146 extends from the first pawl segment 72 and the second tooth 148 extends from the second pawl segment 74. The first tooth 146 and the second tooth 148 each face outwardly toward the ring gear 46. Therefore, the first tooth 146 and the second tooth 148 each face outwardly toward the ring gear 46 such that the first tooth 146 and the second tooth 148 selectively trap one of the teeth 52 of the ring gear 46 in the gap 150.

During initial movement of the pawl 62 to the disengaged position, utilizing two pawl segments 72, 74 provides that the first tooth 146 and/or the second tooth 148 will release from the trapped tooth 52 of the ring gear 46 and the remaining other one of the first tooth 146 or the second tooth 148 is pushed out of engagement. Specifically, the side profile of the first tooth 146 and the second tooth 148 are angled to allow the pawl 62 to release if one of the first tooth 146 and the second tooth 148 is stuck in engagement with the trapped tooth 52 of the ring gear 46 due to a rotational force being applied to one of the first tooth 146 and the second tooth 148 by the crankshaft 22/ring gear 46 wanting to rotate or turn.

As best shown in FIG. 7, the first tooth 146 can include a front side 152 and a back side 154 opposing each other. The front side 152 of the first tooth 146 is orientated at a second angle 156 relative to the plane 92 that is perpendicular to the longitudinal axis 32. Generally, the second angle 156 can be from about 40.0 degrees to about 50.0 degrees. In one embodiment, the second angle 156 is about 45.0 degrees. Additionally, the back side 154 of the first tooth 146 is orientated at a third angle 158 relative to the plane 92 that is perpendicular to the longitudinal axis 32. Generally, the third angle 158 can be from about 5.0 degrees to about 15.0 degrees. More specifically, the third angle 158 can be from about 7.0 degrees to about 10.0 degrees. In one embodiment, the third angle 158 is about 7.5 degrees. It is to be appreciated that the values of the second and third angles 156, 158 are examples and other values are possible.

Furthermore, as shown in FIG. 10, the first tooth 146 can include a first side surface 160 and a second side surface 162 opposing each other. The first and second side surfaces 160, 162 curve, angle or taper outwardly toward respective first and second side edges 66, 68 of the pawl 62. Specifically, the first and second side surfaces 160, 162 curve, angle or taper outwardly such that the first side surface 160 contours into the first leg 76 and the second side surface 162 contours into the second leg 78. The location of the first tooth 146 and the second tooth 148 relative to the teeth 52 of the ring gear 46 prevents side loading, i.e., applying a force to the side, of the first tooth 146 and the second tooth 148 generally along the first and second side surfaces 160, 162.

Continuing with FIG. 7, the second tooth 148 can include a front side 164 and a back side 166 opposing each other. Furthermore, the front side 164 of the second tooth 148 faces the back side 154 of the first tooth 146. The front side 164 of the second tooth 148 is orientated at a fourth angle 168 relative to the plane 92 that is perpendicular to the longitudinal axis 32. Generally, the fourth angle 168 can be from about 5.0 degrees to about 15.0 degrees. More specifically, the fourth angle 168 can be from about 7.0 degrees to about 10.0 degrees. In one embodiment, the fourth angle 168 is about 8.5 degrees. Additionally, the back side 166 of the second tooth 148 is orientated at an angle 170 (referred to as a fifth angle 170 herein) relative to the plane 92 that is perpendicular to the longitudinal axis 32. Orientating the back side 166 of the second tooth 148 at the fifth angle 170 allows rotation of the ring gear 46 (in a predetermined direction) to cause one of the teeth 52 of the ring gear 46 to engage the back side 166 of the second tooth 148 to move the second tooth 148 toward the disengaged position when a predetermined force is applied to the back side 166 of the second tooth 148. In other words, the fifth angle 170 allows sliding engaging between one of the teeth 52 of the ring gear 46 when the engaged tooth 52 applies a predetermined force to the move the second tooth 148 toward the disengaged position. Generally, the fifth angle 170 can be from about 40.0 degrees to about 50.0 degrees. In one embodiment, the fifth angle 170 is about 45.0 degrees. It is to be appreciated that the values of the fourth and fifth angles 168, 170 are examples and other values are possible.

The length of the first tooth 146 and the length of the second tooth 148 can be different. For example, the length of the second tooth 148 can be longer than the length of the first tooth 146 to allow the second tooth 148 to engage one of the teeth 52 of the ring gear 46 before the first tooth 146. Alternatively, the second pawl segment 74 can move before the first pawl segment 72 to allow the second tooth 148 to engage one of the teeth 52 of the ring gear 46 before the first tooth 146. The second pawl segment 74 or the distal end 88 of the actuator 82 can be configured to allow the second pawl segment 74 to move before the first pawl segment 72.

The back side 166 of the second tooth 148 is a larger angle than the back side 154 of the first tooth 146. By having the second tooth 148 engage the ring gear 46 before the first tooth 146 allows the second tooth 148 to be kicked out due to the angled back side 166 of the second tooth 148 which prevents the first tooth 146, with its angled back side 154, from engaging the ring gear 46. Simply stated, due to the angle of the back side 166 of the second tooth 148, the tooth 52 of the ring gear 46 that engages the back side 166 is move along the angled surface of the back side 166 which moves the second tooth 148 toward the disengaged position. The second pawl segment 74 can be kicked out when the crankshaft 22 is rotating the engine 14 in a reverse direction 169 (see FIG. 2) about the longitudinal axis 32 and the first pawl segment 72 can be kicked out when the crankshaft 22 is rotating the engine 14 in a forward direction 171 (see FIG. 2) about the longitudinal axis 32. The angle of the back sides 154, 166 are designed to reduce the force needed to move the pawl 62 to the disengaged position to minimize grinding between the ring gear 46 and the pawl 62.

Turning to FIGS. 8 and 9, the first and second pawl segments 72, 74 can each include a first end 172 and a second end 174 spaced from each other. The first tooth 146 can extend from the first end 172 of the first pawl segment 72 and the second tooth 148 can extend from the first end 172 of the second pawl segment 74. The biasing mechanism 114 engages the second end 174 of both of the first and second pawl segments 72, 74. More specifically, the first biasing arm 134 engages the second end 174 of the first leg 76 of the first pawl segment 72, the second biasing arm 136 engages the second end 174 of the second leg 78 of the first pawl segment 72 and the third biasing arm 138 engages the second end 174 of the second pawl segment 74. As shown in FIG. 9, the spring 118 is spaced from the pawl 62 except at the second end 174 of the first and second pawl segments 72, 74. In other words, the spring 118 can only engage the pawl 62 at the second end 174 of the first and second pawl segments 72, 74 such that the spring 118 applies the desired spring force to continuously rotate the pawl 62 to the disengaged position. Generally, the length of the second pawl segment 74 between the first and second ends 172, 174 can be less than the length of the first pawl segment 72 between the first and second ends 172, 174 as shown in FIG. 10. Specifically, the length of the second pawl segment 74 from the pivot axis 64 to the first end 172 of the second pawl segment 74 is less than the length of the first pawl segment 72 from the pivot axis 64 to the first end 172 of the first pawl segment 72. By having the different lengths, the first tooth 146 and the second tooth 148 can be positioned to present the gap 150 therebetween.

As used herein, the term substantially refers to quantities, values, or dimensions that are within manufacturing variance or tolerance ranges of being exact or that are subject to human error during installation. Substantially equal dimensions, for example, may be planned as ideally equal but normal manufacturing tolerances may cause the resulting dimensions to vary by 10-20 percent for different pieces.

While the best modes for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A locking assembly for a ring gear operatively connected to a crankshaft, the assembly comprising:
  a pawl rotatable about a pivot axis between an engaged position and a disengaged position, with the pawl adapted to engage the ring gear when in the engaged position for preventing movement of the ring gear, wherein the pawl includes a first pawl segment and a second pawl segment each rotatable about the pivot axis;
  an actuator selectively actuated to move the pawl to the engaged position;
  a biasing mechanism engaging the pawl to continuously bias the pawl toward the disengaged position; and
  wherein the pawl includes a first tooth and a second tooth spaced from each other to define a gap therebetween, with the first tooth and the second tooth adapted to trap a tooth of the ring gear in the gap when the pawl is in the engaged position for preventing rotation of the ring gear.

2. An assembly as set forth in claim 1 wherein:
  the actuator includes an extension having a distal end engaging the pawl, with the extension and the distal end rotatable about a first axis; and
  the distal end includes a roller engaging the pawl and rotatable along the pawl as the extension rotates about the first axis.

3. An assembly as set forth in claim 1 wherein the actuator includes an extension having a distal end engaging the pawl, with the extension and the distal end movable along a first axis.

4. An assembly as set forth in claim 1 wherein the first pawl segment includes a first leg and a second leg spaced from each other with the second pawl segment disposed between the first and second legs.

5. An assembly as set forth in claim 4 wherein the first and second pawl segments each include a first end and a second end spaced from each other, with the first tooth extending from the first end of the first pawl segment and the second tooth extending from the first end of the second pawl segment, and wherein the first tooth and the second tooth align with each other in a spaced relationship.

6. An assembly as set forth in claim 4 wherein:
  the biasing mechanism includes a member and a spring, with the spring engaging the pawl and the member to continuously bias the pawl to the disengaged position and into continuous engagement with the actuator; and
  the spring defines a plurality of slits spaced from each other to split the spring into a first biasing arm engaging the first leg of the first pawl segment, a second biasing arm engaging the second leg of the first pawl segment and a third biasing arm engaging the second pawl segment.

7. An assembly as set forth in claim 1 wherein the biasing mechanism includes a spring engaging the pawl to continuously bias the pawl to the disengaged position and into continuous engagement with the actuator.

8. An assembly as set forth in claim 7 wherein:
  the biasing mechanism further includes a member; and
  the spring includes a first portion, a second portion and a third portion disposed between the first and second portions, with the first portion engaging the pawl and the third portion engaging the member.

9. An assembly as set forth in claim 8 wherein:
  the first portion of the spring defines a plurality of slits spaced from each other to split the first portion into a first biasing arm, a second biasing arm and a third biasing arm, with the third biasing arm disposed between the first and second biasing arms;
  the pawl includes a first pawl segment and a second pawl segment each rotatable about the pivot axis, with the first pawl segment including a first leg and a second leg spaced from each other with the second pawl segment disposed between the first and second legs; and
  the first biasing arm engages the first leg of the first pawl segment, the second biasing arm engages the second leg of the first pawl segment and the third biasing arm engages the second pawl segment.

10. An assembly as set forth in claim 1 wherein:
  the pawl includes an outer side facing the actuator and an inner side opposing the outer side;
  the first tooth and the second tooth each extend outwardly from the inner side away from the outer side; and the first tooth and the second tooth align with each other in a spaced relationship along the inner side.

11. An assembly as set forth in claim 10 wherein:
  the pawl includes a first pawl segment and a second pawl segment each rotatable about the pivot axis, with the first and second pawl segments each including the outer and inner sides such that the first tooth extends from the inner side of the first pawl segment and the second tooth extends from the inner side of the second pawl segment, and the first pawl segment includes a first leg and a second leg spaced from each other with the second pawl segment disposed between the first and second legs; and
  the first and second pawl segments each include a first end and a second end spaced from each other, with the first tooth extending from the first end of the first pawl segment and the second tooth extending from the first end of the second pawl segment, and the biasing mechanism engages the second end of both of the first and second pawl segments.

12. An assembly as set forth in claim 11 wherein the biasing mechanism includes a spring and a dowel pin, with the dowel pin attached to the second pawl segment and engaging the spring to position the spring relative to the first and second pawl segments.

13. A vehicle comprising:
a ring gear selectively rotatable about a longitudinal axis and including a plurality of teeth spaced from each other radially about the longitudinal axis;
a locking assembly including a pawl rotatable about a pivot axis between an engaged position engaging the ring gear to prevent rotation of the ring gear and a disengaged position spaced from the ring gear to allow rotation of the ring gear; and
wherein the pawl includes a first tooth and a second tooth spaced from each other to define a gap therebetween such that one of the teeth of the ring gear is trapped in the gap between the first tooth and the second tooth to prevent rotation of the ring gear when the pawl is in the engaged position;
wherein the pawl includes separate pawl segments each rotatable about the pivot axis, with the first tooth extending from one of the pawl segments and the second tooth extending from another one of the pawl segments.

14. A vehicle as set forth in claim 13 wherein the second tooth includes a front side and a back side opposing each other, the back side of the second tooth is orientated at an angle relative to a plane that is perpendicular to the longitudinal axis such that rotation of the ring gear causes one of the teeth of the ring gear to engage the back side of the second tooth to move the second tooth toward the disengaged position when a predetermined force is applied to the back side of the second tooth.

15. A vehicle as set forth in claim 13 wherein:
each of the teeth of the ring gear face outwardly away from the longitudinal axis,
the first tooth and the second tooth each face toward the ring gear such that the first tooth and the second tooth selectively trap one of the teeth of the ring gear in the gap;
the ring gear includes a first side and a second side spaced from each other to present a first width of the ring gear, with the teeth of the ring gear disposed between the first and second sides; and
the pawl includes a first side edge and a second side edge spaced from each other to present a second width substantially equal to or less than the first width.

16. A vehicle as set forth in claim 15 wherein:
the locking assembly includes an actuator selectively actuated to move the pawl to the engaged position;
the locking assembly includes a biasing mechanism engaging the pawl to continuously bias the pawl toward the disengaged position; and
the first tooth and the second tooth align with each other in a spaced relationship.

17. A vehicle as set forth in claim 16:
further including an engine block having a crankshaft disposed therein, with the crankshaft rotatable about the longitudinal axis and the ring gear disposed outside of the engine block, and with the ring gear operatively connected to the crankshaft such that the ring gear and the crankshaft rotatable in unison about the longitudinal axis when the pawl is in the disengaged position, and the ring gear and the crankshaft remain substantially stationary when the pawl is in the engaged position; and
further including a transmission housing attached to the engine block, with the transmission housing having a first support and a second support spaced from each other, with the pawl rotatable attached to the first and second supports.

18. A vehicle as set forth in claim 17 wherein the actuator includes an extension having a distal end engaging the pawl, and the actuator includes a motor and gearing operatively connected to each other and disposed outside of the transmission housing, and the actuator includes a shaft operatively connected to the gearing, the motor and the extension to rotate the extension and the distal end about a first axis.

19. A vehicle as set forth in claim 17 wherein:
the biasing mechanism includes a member and a spring, with the spring engaging the pawl and the member to continuously bias the pawl to the disengaged position and into continuous engagement with the actuator; and
the spring includes a first portion, a second portion and a third portion disposed between the first and second portions, with the first portion engaging the pawl, the second portion engaging the transmission housing and the third portion engaging the member.

20. A vehicle comprising:
a ring gear selectively rotatable about a longitudinal axis and including a plurality of teeth spaced from each other radially about the longitudinal axis;
a locking assembly including a pawl rotatable about a pivot axis between an engaged position engaging the ring gear to prevent rotation of the ring gear and a disengaged position spaced from the ring gear to allow rotation of the ring gear;
wherein the pawl includes a first tooth and a second tooth spaced from each other to define a gap therebetween such that one of the teeth of the ring gear is trapped in the gap between the first tooth and the second tooth to prevent rotation of the ring gear when the pawl is in the engaged position;
further including an engine housing the crankshaft;
further including a first clutch operatively connected to the crankshaft and disposed downstream to the engine;
wherein the ring gear and the locking assembly are disposed downstream to the first clutch;
further including an input member of a transmission operatively connected to the crankshaft; and
further including a damper operatively connected to the input member and disposed downstream to the locking assembly.

* * * * *